(12) United States Patent
Narikawa et al.

(10) Patent No.: US 10,590,904 B2
(45) Date of Patent: Mar. 17, 2020

(54) GUIDE VANE OF HYDRAULIC MACHINERY AND HYDRAULIC MACHINE

(71) Applicant: KABUSHIKI KAISHA TOSHIBA, Minato-ku (JP)

(72) Inventors: Madoka Narikawa, Yokohama (JP); Hideyuki Kawajiri, Yokohama (JP); Norio Ohtake, Yokohama (JP); Koichi Kubo, Kawasaki (JP); Toshifumi Kurokawa, Kamakura (JP); Nobuaki Noda, Kita (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 258 days.

(21) Appl. No.: 15/290,314

(22) Filed: Oct. 11, 2016

(65) Prior Publication Data

US 2017/0260958 A1  Sep. 14, 2017

(30) Foreign Application Priority Data

Mar. 10, 2016 (JP) .................. 2016-047048

(51) Int. Cl.
  *F03B 3/18* (2006.01)
  *F03B 13/10* (2006.01)
  *F03B 3/02* (2006.01)

(52) U.S. Cl.
  CPC ............ *F03B 3/183* (2013.01); *F03B 3/02* (2013.01); *F03B 3/186* (2013.01); *F03B 13/10* (2013.01); *F05B 2250/182* (2013.01); *Y02E 10/223* (2013.01); *Y02E 10/226* (2013.01)

(58) Field of Classification Search
  CPC .. F03B 3/183; F03B 3/02; F03B 3/186; F04D 29/462; F04D 29/483; F01D 9/04; F01D 17/16
  See application file for complete search history.

(56) References Cited

U.S. PATENT DOCUMENTS 5,873,700 A * 2/1999 Ichikawa ............... F01D 5/288
                                                          415/160
6,461,105 B1 * 10/2002 Nicolson ................ F01D 5/141
                                                          415/160

(Continued)

FOREIGN PATENT DOCUMENTS

JP         5-75478       10/1993

*Primary Examiner* — Kenneth Bomberg
*Assistant Examiner* — John S Hunter, Jr.
(74) *Attorney, Agent, or Firm* — Oblon, McClelland, Maier & Neustadt, L.L.P.

(57) ABSTRACT

A vane body of a guide vane includes a leading edge, and a trailing edge which is located closer to a runner than the leading edge, when located radially outside the runner. A projection extending in a direction from the trailing edge toward the leading edge is provided on an internal-diameter side blade face of the vane body, at least in any one of one side area of the internal-diameter side blade face and the other side area thereof in an axial direction of a guide vane rotation shaft, the internal-diameter side blade face being disposed on a side of the runner. The projection has a projection rear end of an arcuate shape, which projection rear end is formed to extend along a rotation trajectory which is drawn by the trailing edge when the vane body is rotated about the guide vane rotation shaft.

5 Claims, 9 Drawing Sheets

(56) References Cited

U.S. PATENT DOCUMENTS

| | | | | |
|---|---|---|---|---|
| 2012/0128480 A1* | 5/2012 | Gomez | ............... | F01D 5/141 |
| | | | | 415/208.1 |
| 2014/0341729 A1* | 11/2014 | Osako | ............... | F01D 17/165 |
| | | | | 415/208.1 |
| 2016/0160834 A1* | 6/2016 | Ko | ........................ | F03B 3/02 |
| | | | | 415/155 |

* cited by examiner

GUIDE VANE OF HYDRAULIC MACHINERY AND HYDRAULIC MACHINE

CROSS-REFERENCE TO RELATED APPLICATIONS

This application is based upon and claims the benefit of priority from Japanese Patent Application No. 2016-47048, filed on Mar. 10, 2016; the entire contents of which are incorporated herein by reference.

FIELD

Embodiments described herein relate generally to a guide vane of a hydraulic machine and a hydraulic machine.

BACKGROUND

For example, a Francis-type turbine and a pump turbine are known as a hydraulic machine. FIG. 15 is a plan view showing a stationary blade row channel of a generally Francis-type pump turbine, which is formed by guide vanes 120 and stay vanes 130. The guide vanes 120 are circumferentially arranged with an interval there between to surround a runner, not shown, radially outside the runner. The stay vanes 130 are circumferentially arranged with an interval there between, radially outside a blade row of the guide vanes 120. A not-shown casing is disposed radially outside the stay vanes 130.

White arrows in FIG. 15 depict an orientation of water flow during a turbine operation, while black arrows therein depict an orientation of water flow during a pump operation. As shown by the white arrows, in the Francis-type pump turbine, during the turbine operation, water from the casing flows through the stay vanes 130 and the guide vanes 120 into the runner. The runner converts water energy to a torque, so that a generator motor is driven through a main shaft, not shown. The water having exited the runner is introduced to a tailrace through a suction pipe, not shown. On the other hand, during the pump operation, water flows reversely to the turbine operation, as shown by the black arrows. Namely, water from the suction pipe passes through the runner to flow through the guide vanes 120 and the stay vanes 130, and flows out from the casing to an upper reservoir.

FIG. 16 is a view of the guide vane 120 seen along the circumferential direction. FIG. 17 is a sectional view of the guide vane 120 taken along the A-A line in FIG. 16. The guide vane 120 in such a Francis-type pump turbine is rotatable about a guide vane rotation shaft 121. By rotating the guide vane 120 to vary an angle thereof, a channel area of a channel formed between the adjacent guide vanes 120 can be varied. Thus, a power generation output can be adjusted by varying an amount of water to the runner.

As shown in FIG. 16, in the Francis-type pump turbine of this kind, the guide vane 120 is located between an upper cover 111, which defines a part of the channel running from the casing up to the runner and is located on the side of the generator motor, and a lower cover 112, which is spaced apart from the upper cover 111 and is positioned on the side of the suction pipe. As described above, since the guide vane 120 is rotatable for adjusting an amount of water, it is necessary to provide a gap (g) between the guide vane 120 and the upper cover 111, and between the guide vane 120 and the lower cover 112, in order to avoid contact there between.

However, such a gap (g) poses a problem in that it increases a hydraulic power loss. How water flows through the gap (g) is described with reference to FIGS. 16 and 17. FIG. 17 schematically shows water flows (a) to (c) by arrows, based on an analysis result.

Namely, as shown in FIGS. 16 and 17, due to the provision of the gap (g), a gap flow (b) passing through the gap (g) is generated, apart from a main flow (a) flowing along a blade surface of the guide vane 120. There is a possibility that the gap flow (b) comes together with the main flow (a) flowing between the adjacent guide vanes 120, which in turn generates a turbulent flow (c) (see FIG. 17) in the vicinity of a rear end of the guide vane 120 above and below thereof. Thus, a separate flow that does not flow along the guide vane 120 is generated, as a result of which a hydraulic power loss disadvantageously may increase. In addition, since the turbulent flow (c) near the rear end of the guide vane 120 becomes a flow flowing in a direction different from that of the main flow (a) and flows into the runner, there is a possibility that a flow at an runner inlet becomes a turbulent flow which increases a runner loss.

In order to reduce the aforementioned gap flow (b), it can be considered that the gap (g) is made smaller. However, the smaller a distance between the guide vane 120 and the upper cover 111/the lower cover 112 is, the greater the risk of interference between the guide vane 120 and the upper cover 111/the lower cover 112 becomes, during the rotation of the guide vane 120. In addition, if a foreign matter such as a stone enters, there is a greater risk that the stone is caught by the gap (g). Thus, reduction of the gap (g) in size has limitations.

In order to reduce the gap flow in a hydraulic machine, a technique for providing a groove in an end face of a guide vane is known. According to this technique, since an area of the gap is largely increased by the groove, a pressure inside the groove locally varies. Thus, a flow velocity of the flow flowing into the groove lowers, whereby a leakage prevention effect can be obtained. In addition, there is known another technique for providing a recessed groove in a cover wall surface facing an end face of the guide vane.

SUMMARY OF THE INVENTION

Respective embodiments described here below have been made in view of the above-described circumstances, and an object thereof is to provide a guide vane of a hydraulic machine and a hydraulic machine capable of effectively reducing a hydraulic power loss, by effectively reducing an amount of water leaking from one blade face of the guide vane to the other blade face thereof.

DETAILED DESCRIPTION OF THE INVENTION

Figure 15:
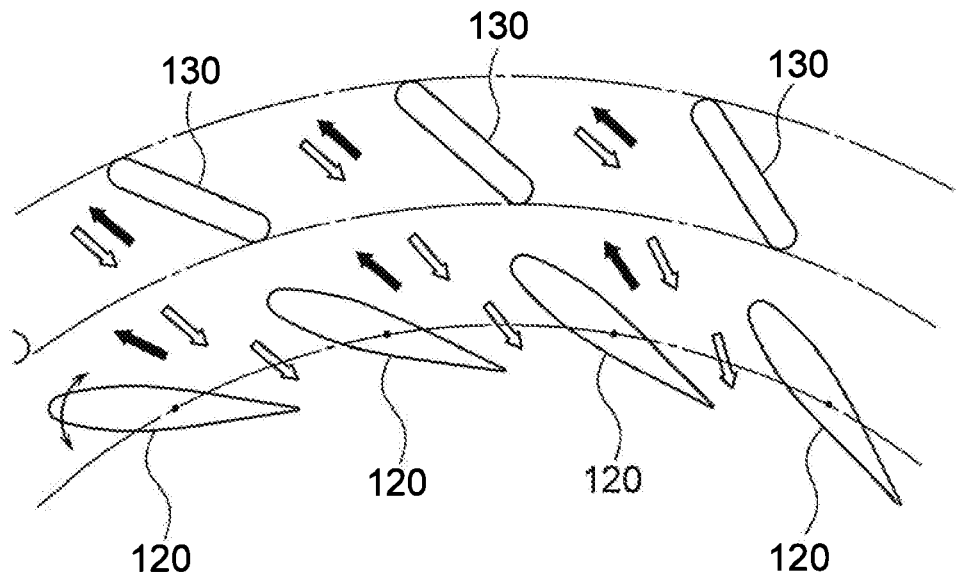
FIG. 15 is a plan view showing a stationary blade row channel of a general Francis-type pump turbine, which is formed by guide vanes and stay vanes.
Figure 16:
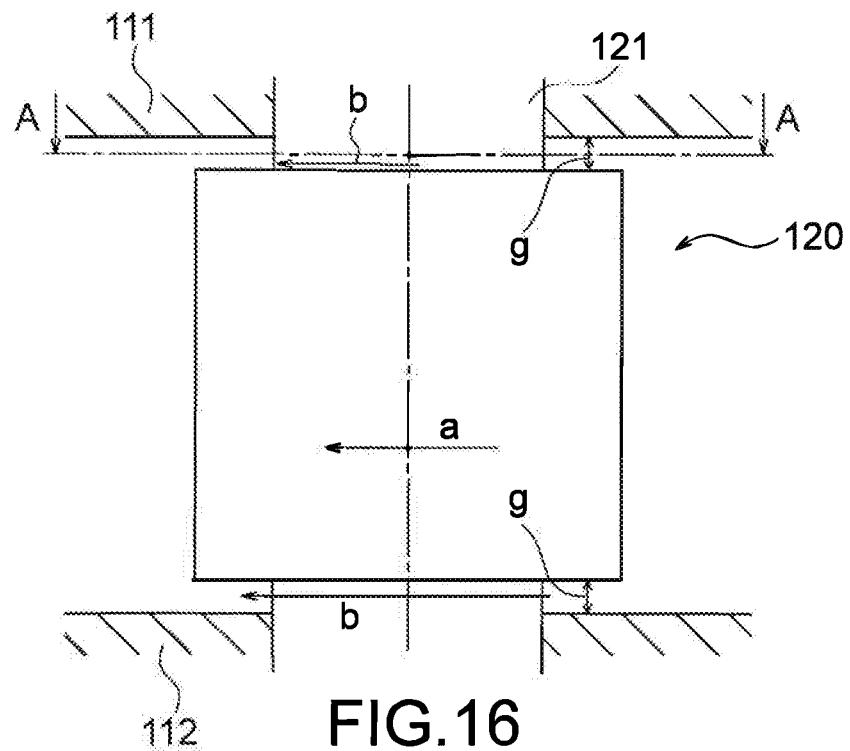
FIG. 16 is a view of the guide vane of FIG. 15 seen in a circumferential direction.
Figure 17:
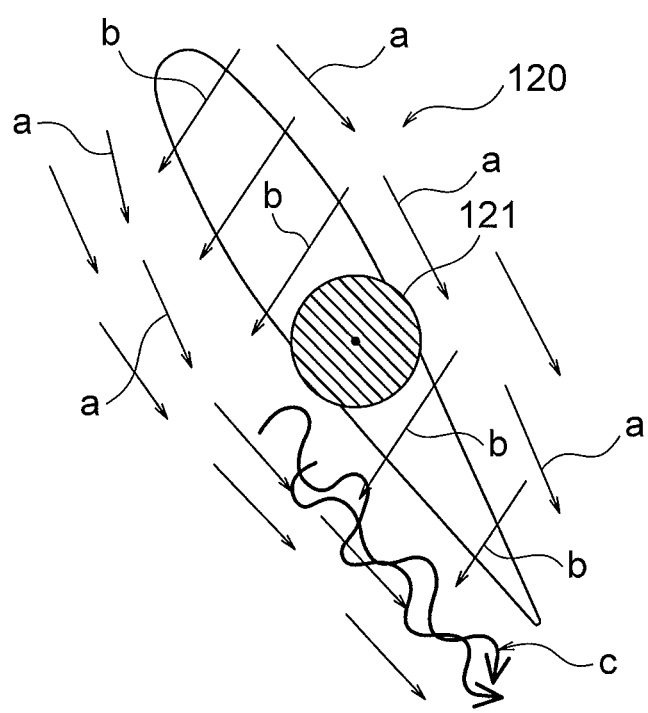
FIG. 17 is a sectional view taken along the A-A line of FIG. 16.

Respective embodiments are described in detail below with reference to the attached drawings. In the description of the respective embodiments, when constituent elements explained with reference to FIGS. 15 to 17 is explained, the same reference numbers as those used in FIGS. 15 to 17 are sometimes used.

A guide vane of a hydraulic machine according to each embodiments comprises a vane body and a guide vane rotation shaft connected to the vane body, the guide vane rotation shaft being configured to rotate the entire vane body by a rotation thereof, the guide vane being located radially outside a runner of a hydraulic machine to be rotatable about the guide vane rotation shaft, with the guide vane rotation shaft being in parallel to a rotation axis of the runner. The vane body includes a leading edge, and a trailing edge which is located closer to the runner than the leading edge, when located radially outside the runner. A projection extending in a direction from the trailing edge toward the leading edge is provided on an internal-diameter side blade face of the vane body, at least in any one of one side area of the internal-diameter side blade face and the other side area thereof in an axial direction of the guide vane rotation shaft, the internal-diameter side blade face being disposed on a side of the runner. The projection has a projection rear end of an arcuate shape, which projection rear end is formed to extend along a rotation trajectory which is drawn by the trailing edge when the vane body is rotated about the guide vane rotation shaft.

A hydraulic machine according to the embodiments comprises a runner configured to rotate about a rotation axis, and the aforementioned guide vane located radially outside the runner.

(First Embodiment)

Figure 1:
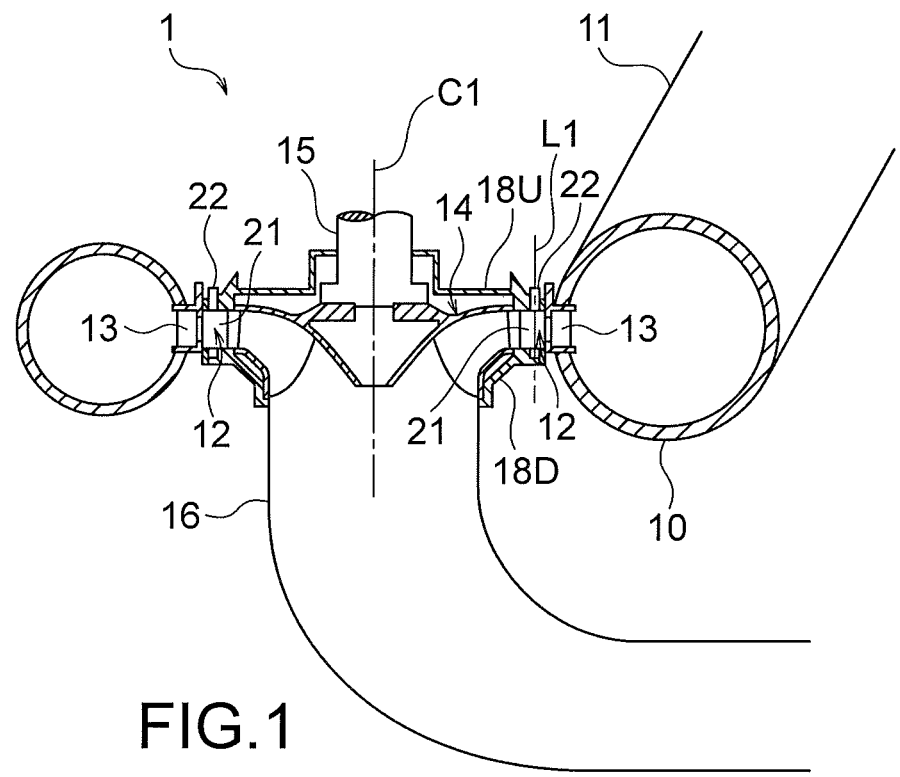
FIG. 1 is a meridian sectional view of a Francis-type pump turbine according to a first embodiment.

FIG. 1 shows a Francis-type pump turbine 1 as an example of a hydraulic machine according to a first embodiment. In the description below, the Francis-type pump turbine 1 is referred to simply as "turbine 1". The turbine 1 includes: a casing 10 into which water from a not-shown upper reservoir flows through an iron pipe 11, a plurality of guide vanes 12, a plurality of stay vanes 13, and a runner 14.

In the turbine 1, during a turbine operation, water from the casing 10 flows into the runner 14 through a stationary blade row channel formed by the guide vanes 12 and the stay vanes 13. Thus, the runner 14 rotates about a rotation axis C1. In the description below, the terms "circumferential direction" and "circumferentially" mean a direction in which the runner 14 rotates about the rotation axis C1, and the terms "radial direction" and "radially" mean a direction perpendicular to the rotation axis C1.

The casing 10 is formed to have a spiral shape. During the turbine operation, water from the upper reservoir passes through the casing 10 to be supplied to the runner 14 through the stay vanes 13 and the guide vanes 12. The stay vanes 13 are members that cause the water supplied from the casing 10 to flow therefrom to the guide vanes 12. The stay vanes 13 are circumferentially arranged radially inside the casing 10, with a predetermined interval there between. The guide vanes 12 are members that cause the water from the stay vanes 13 to flow therefrom into the runner 14. The guide vanes 12 are circumferentially arranged radially inside the stay vanes 13 and radially outside the runner 14, with a predetermined interval there between.

The runner 14 is configured to rotate about the rotation axis C1 with respect to the casing 10, and is connected to a not-shown generator motor through a main shaft 15 through which the rotation axis C1 centrally passes. The generator motor generates power by being rotated by the runner 14. On the other hand, a pump operation is carried out when the generator motor rotates the runner 14. During the turbine operation, a suction pipe 16 discharges water flowing out from the runner 14 to a not-shown lower reservoir. During the pump operation, the suction pipe 16 causes water to pass therethrough toward the runner 14.

Figure 2:
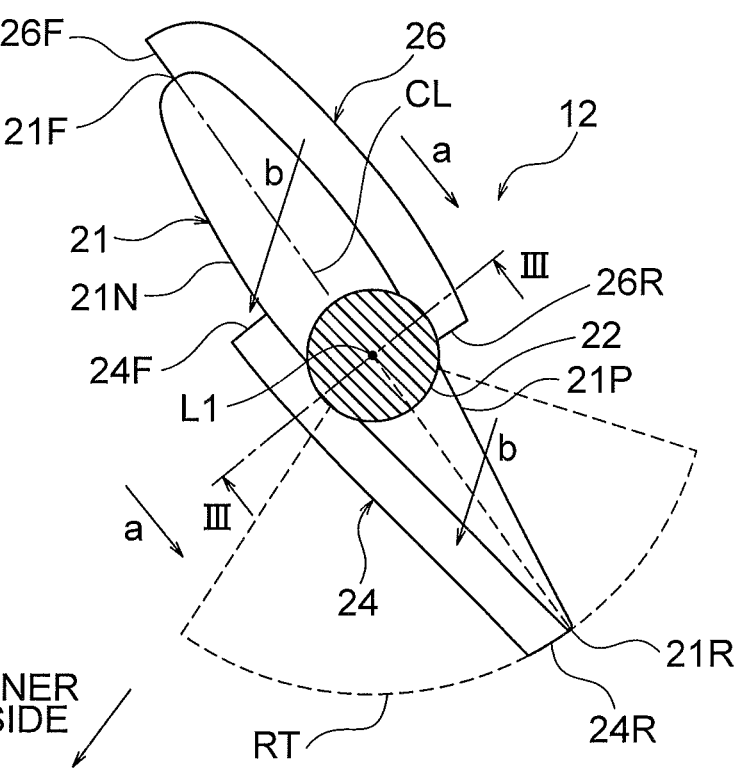
FIG. 2 is a view of a guide vane of the Francis-type pump turbine shown in FIG. 1, seen from one side in an axial direction of a guide vane rotation shaft.
Figure 3:
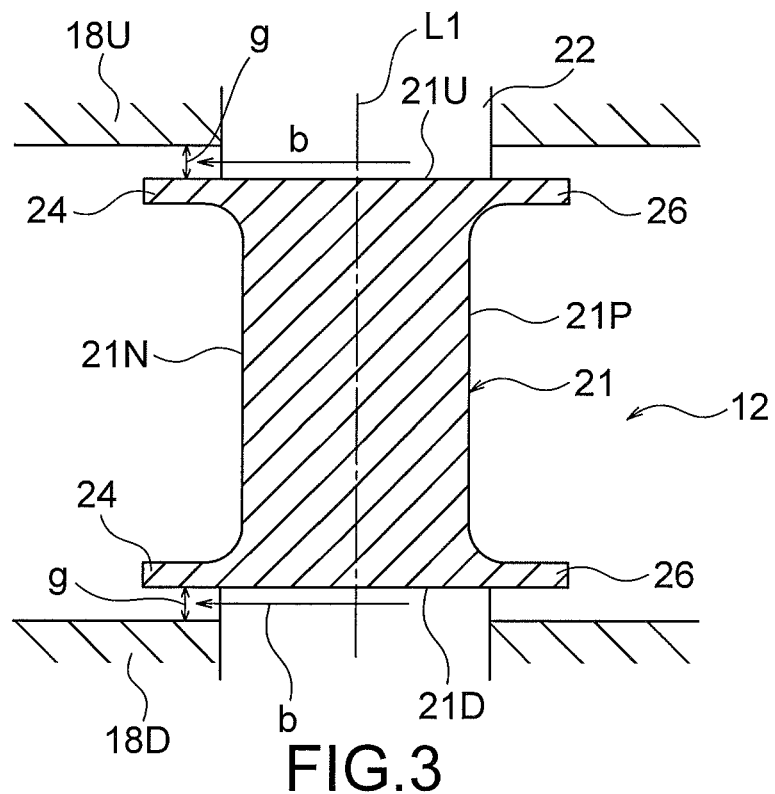
FIG. 3 is a sectional view taken along the III-III line of FIG. 2.
Figure 4:
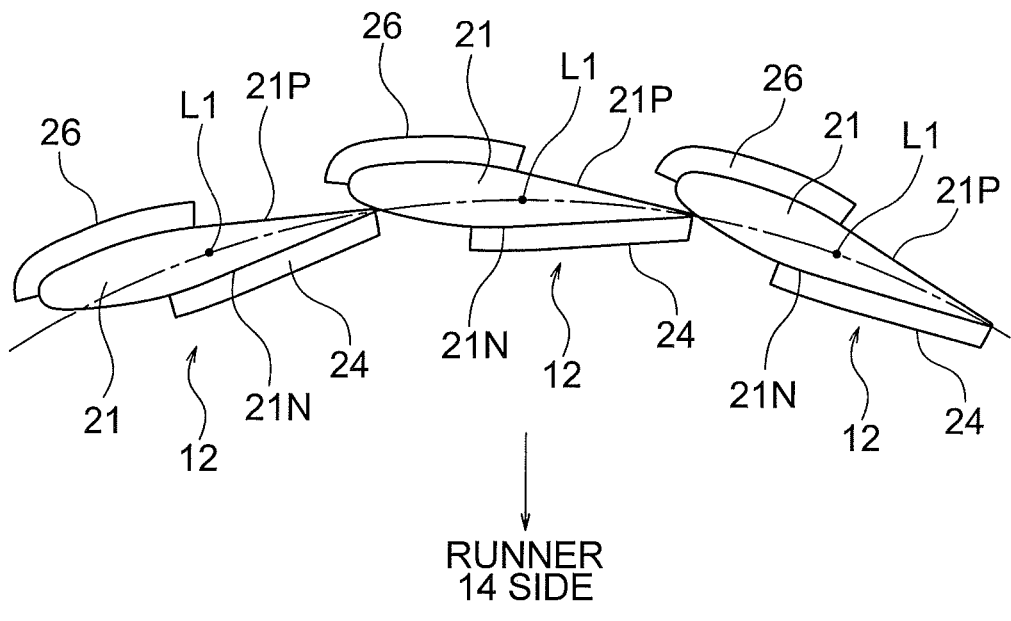
FIG. 4 is a view showing a blade row formed by the guide vanes of the Francis-type pump turbine shown in FIG. 1.

FIG. 2 is a view of the guide vane 12 seen from one side in the axial direction of a below-described guide vane rotation shaft 22 (from above). FIG. 3 is a sectional view taken along the III-III line of FIG. 2. FIG. 4 is a plan view of a blade row formed by the guide vanes 12. As shown in FIG. 1, in this embodiment, the guide vanes 12 and the runner 14 are covered with an upper cover 18U from above, and are covered with a lower cover 18D from below. As shown in FIGS. 1 to 3, the guide vane 12 is composed of a vane body 21 disposed in a space between the upper cover 18U and the lower cover 18D, and the guide vane rotation shaft 22 connected to the vane body 21 to extend through the upper and lower covers 18U and 18D, the guide vane rotation shaft 22 being configured to rotate the entire vane body 21 by a rotation thereof.

In FIG. 3, the guide vane rotation shaft 22 is not illustrated in cross-section, for the sake of convenience. In FIGS. 1 to 4, the reference symbol L1 depicts a rotation axis passing through a center of the guide vane rotation shaft 22. As shown by L1, the guide vane 12 is located such that the guide vane rotation shaft 22 is in parallel to the rotation axis C1 of the runner 14. The upper cover 18U in this embodiment covers the guide vanes 12 from the one axial direction of the guide vane rotation shaft 22 (from above), and the lower cover 18D covers the guide vane 14 from the other axial direction of the guide vane rotation shaft 22 (from below). Here, as shown in FIG. 3, a gap (g) is provided between the guide vane 12 and the upper cover 18U, and between the guide vane 12 and the lower cover 18D. The gap (g) is determined such that the guide vane 12 and the upper cover 18U/the lower cover 18D do not come into contact with each other.

Above the upper cover 18U, the guide vane rotation shaft 22 is connected to a driving apparatus including a not-shown link mechanism. The driving apparatus is capable of rotating the respective guide vane rotation shafts 22 by means of the link mechanism. Thus, angles of the respective vane bodies 21 can be simultaneously and uniformly adjusted as a whole, whereby a channel area of a channel formed between the adjacent guide vanes 12 can be varied. By operating such guide vanes 12, the turbine 1 is able to supply water of a desired flow rate from the guide vanes to the runner 14, so as to adjust a power generation output.

As shown in FIG. 2, the vane body 21 of the guide vane 12 has a leading edge 21F and a trailing edge 21R which is located closer to the runner 14 than the leading edge 21F, when located radially outside the runner 14. The reference symbol CL in FIG. 2 depicts a camber line of the vane body 21. In this embodiment, the leading edge 21F means a portion with which one end point of the camber line CL is continuous in the axial direction of the guide vane rotation shaft 22, and the trailing edge 21R means a portion with which the other end point of the camber line CL is continuous in the axial direction of the guide vane rotation shaft 22. The vane body 21 means a streamline shape portion defined by an internal-diameter side blade face 21N disposed on the side of the runner 14, and an external-diameter side blade face 21P opposed thereto.

In this embodiment, as shown in FIGS. 2 and 3, filet-shaped internal-diameter side projections 24 are provided on both one side area (upper side area) and the other side area (lower side area) of the internal-diameter side blade face 21N of the blade body 21 in the axial direction of the guide vane rotation shaft 22, the internal-diameter side face 21N being located on the side of the runner 14. Each of the internal-diameter side projections 24 projects from the blade face surrounding them, and extends in a direction from the trailing edge 21R toward the leading edge 21F. Each internal-diameter side projection 24 has a projection front end 24F positioned on the side of the leading edge 21F, and a projection rear end 24R positioned on the side of the trailing edge 21R. As shown in FIG. 2, the projection rear end 24R in this embodiment is formed to have an arcuate shape. The projection rear end 24R is formed to extend along a rotation trajectory RT which is drawn by the trailing edge 21R when the vane body 21 is rotated about the guide vane rotation shaft 22.

As shown in FIG. 3, an outer face of the internal-diameter side projection 24, which faces outside in the axial direction of the guide vane rotation shaft 22, extends along the opposed cover 18U or 18D, and is coplanarly (flush) continuous with an end face of the vane body 21 on which the internal-diameter side projecting 24 is disposed. Namely, the outer face of the upper internal-diameter side projection 24, which is opposed to the upper cover 18U, is coplanarly continuous with an upper end face 21U of the vane body 21, and the outer face of the lower internal-diameter side projection 24, which is opposed to the lower cover 18D, is coplanarly continuous with a lower end face 21D of the vane body 21.

On the other hand, in the illustrated example, an inner face of the internal-diameter side projection 24, which faces inside (central side) in the axial direction of the guide vane rotation shaft 22, is formed such that it extends arcuately from a root side thereof to come close to the outer face toward its projection side, and then extends in parallel to the outer face. Thus, a thickness of the internal-diameter side projection 24 is larger in a root portion thereof, and is substantially uniform in another portion thereof. As a result, a joint strength of the internal-diameter side projection 24 to the vane body 21 can be improved.

As shown in FIGS. 2 and 3, in this embodiment, filet-shaped external-diameter side projections 26 are provided on both one side area (upper side area) and the other side area (lower side area) of the external-diameter side blade face 21P of the vane body 21 in the axial direction of the guide vane rotation shaft 22, the external-diameter side blade face 21P being located on the side opposed to the runner 14,. As shown in FIG. 2, each of the external-diameter side projections 26 projects from the blade face surrounding them, and extend in a direction from the leading edge 21F toward the trailing edge 21R. In this embodiment, each external-diameter side projection 26 extends from the leading edge 21F as a starting point toward the trailing edge 21R. However, each external-diameter side projection 26 may extend from a point away from the leading edge 21F toward the trailing edge 21R.

As shown in FIG. 2, each of the external-diameter side projections 26 has a projection front end 26F positioned on the side of the leading edge 21F, and a projection rear end 26R positioned on the side of the trailing edge 21R. The projection leading edge 26F extends along an extension of the camber line CL. As shown in FIG. 3, an outer face of the external-diameter side projection 26, which faces outside in the axial direction of the guide vane rotation shaft 22, extends along the opposed cover 18U or 18D, and is coplanarly (flush) continuous with the end face of the vane body 21. An inner face of the external-diameter side projection 26, which faces inside (central side) in the axial direction of the guide vane rotation shaft 22, has the same shape as that of the inner face of the internal-diameter ide projection 24. Thus, a thickness of the external-diameter side projection 26 is larger in a root portion thereof, and is substantially uniform in another portion thereof.

FIG. 4 shows a full closed condition in which a channel formed between the adjacent guide vanes 12 is full closed.

When the operation of the turbine 1 is stopped, the guide vanes 12 are set in the full closed condition. In the full closed condition, it is necessary for the adjacent guide vanes 12 that the external-diameter side blade face 21P of one of the guide vanes 12 and the internal-diameter side blade face 21N of the other of the guide vanes 12 are hermetically in contact with each other, without any gap formed there between. Thus, the internal-diameter side projection 24 and the external-diameter side projection 26 are located on positions at which they do not interfere with other external-diameter side projection 26 and the other internal-diameter side projection 24, when the guide vane 12 is moved from a full open position to a full closed position.

In this embodiment, the internal-diameter side projection 24 extends from the trailing edge 21R over the guide vane rotation shaft 22 toward the leading edge 21, while the external-diameter side projection 26 extends from an area on the side of the leading edge 21F up to a point near the guide vane rotation shaft 22. However, the lengths of these respective projections 24 and 26 are not specifically limited.

Figure 5:
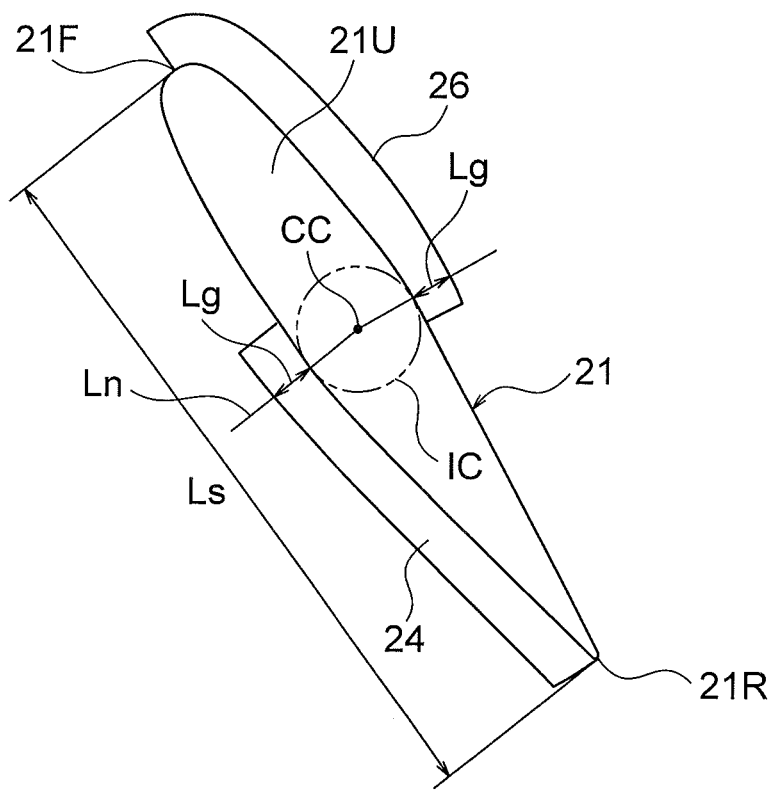
FIG. 5 is a view for explaining dimensions of the guide vane of the Francis-type pump turbine shown in FIG. 1.

Next, dimensions of the guide vane 12 are described with reference to FIG. 5. In FIG. 5, the reference symbol Ls depicts a chord length of the vane body 21, and the reference symbol Lg depicts a projection width of the internal-diameter projection 24 and the external-diameter projection 26 projecting from the vane body 21. Specifically, FIG. 5 shows the upper end face 21U of the vane body 21 on which the upper internal-diameter ide projection 24 and the upper external-diameter side projection 26 are disposed. Thus, Lg is a chord length of the upper end face 21U of the vane body 21, which is a linear distance between the leading edge 21F and the trailing edge 21R of the upper end face 21U. In the vane body 21, it is possible to draw a plurality of inscribed circles that are in contact with the blade faces 21N and 21P about any point on the camber line CL. In a line extending from a center of a certain inscribed circle drawn in the vane body 21 to intersect with the internal-diameter side projection 24 or the external-diameter side projection 26 through a point of contact, Lg means a distance between the point of contact and the intersection. FIG. 5 shows, as an example, an inscribed circle IC about a point near the center of the camber line CL. For example, in a line Ln extending from a center CC of the inscribed circle IC to intersect with the internal-diameter side projection 24 through a point of contact on the internal-diameter side blade face 21N, a distance between the point of contact and the intersection means the projection width Lg of the internal-diameter side projection 24.

In this embodiment, $2 \leq Lg/Ls \times 100 \leq 10$ (expression (1)) is established. To be specific, the relationship of the expression (1) is established between the upper internal-diameter side projection 24 and the corresponding upper end face 21U of the vane body 21, and between the upper external-diameter side projection 26 and the corresponding upper end face 21U of the vane body 21. Also, the same relationship is established between the lower internal-diameter side projection 24/the lower external-diameter side projection 26 and the vane body 21.

Figure 6:
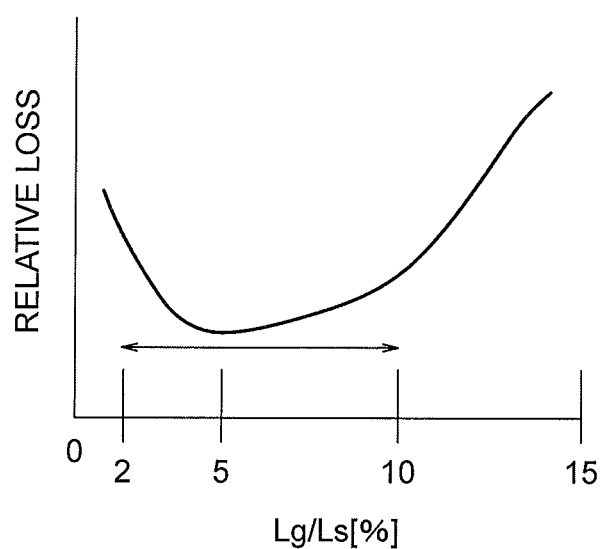
FIG. 6 is graph showing a relationship between the dimension of the guide vane of the Francis-type pump turbine shown in FIG. 1 and a hydraulic power loss.

FIG. 6 is a graph showing a relationship between Lg/Ls (projection width/chord length) and a hydraulic power loss (relative loss). As apparent from FIG. 6, when a percentage of Lg/Ls is not less than 2 and not more than 10, the relative loss is sufficiently depressed. Based on such a finding, the relationship of the expression (1) is determined in this embodiment. This tendency shown in FIG. 6 holds true when the lengths of the internal-diameter side projection 24 and the external-diameter side projection 26 are changed.

Next, an operation of this embodiment is described.

During the turbine operation, water introduced from the upper reservoir is introduced to the casing 10 through the iron pipe 11. Thereafter, the water flows from the casing 10 into the runner 14 through the stay vanes 13 and the guide vanes 12. The runner 14 is rotated by a pressure energy of the water passing there through, and drives the generator motor connected thereto through the main shaft 15. Thus, the generator motor generates power. The water flowing out from the runner 14 is discharged to the lower reservoir through the suction pipe 16.

As shown in FIGS. 2 and 3, during such a turbine operation, a part of the water from the stay vanes 13 toward the guide vanes 12 becomes a gap flow (b) that will pass through the gap (g), apart from the main flow (a) (see FIG. 2) which flows along the blade faces 21P and 21N of the guide vane 12. In this embodiment, since the internal-diameter side projection 24 and the external-diameter side projection 26 project from the vane body 21, an area to be in contact with the gap flow (b) increases. Thus, since the gap flow (b) is subjected to resistance from the internal-diameter side projection 24 and the external-diameter side projection 26, a flow velocity of the gap flow (b) lowers. Thus, an amount of water leaking from the external-diameter side blade face 21P to the internal-diameter side blade face 21N reduces, which depresses generation of a turbulent flow which may be created by the gap flow (b) mixed with the main flow (a) flowing between the adjacent guide vanes 12. Also in the pump operation, a leakage amount of water similarly reduces, whereby generation of a turbulent flow can be depressed.

Moreover, in this embodiment, as shown in FIG. 2, the arcuate projection rear end 24R of the internal-diameter side projection 24 is formed to extend along the rotation trajectory RT which is drawn by the trailing edge 21R when the vane body 21 is rotated about the guide vane rotation shaft 22. Thus, it is possible for the internal-diameter side projection 24 to ensure an area to be in contact with the gap flow (b) as large as possible, while avoiding the risk in which the projection rear end 24R and the runner 14 located radially inside thereof interfere with each other. As a result, a water leakage depression effect can be effectively obtained.

Therefore, according to this embodiment, an amount of water leaking from one blade face of the guide vane 12 to the other blade face thereof can be effectively decreased, whereby a hydraulic power loss can be effectively decreased.

In addition, since the inside-diameter side blade face 21N and the external-diameter side blade face 21P are respectively equipped with the internal-diameter side projection 24 and the external-diameter side projection 26, the water leakage depression effect can be sufficiently ensured. In addition, since each of the upper and lower areas of the inside-diameter side blade face 21N and each of the upper and lower areas of the external-diameter side blade face 21P are equipped with the internal-diameter side projection 24 and the external-diameter side projection 26, the water leakage depression effect can be sufficiently ensured.

In addition, since the relationship $2 \leq Lg/Ls \times 100 \leq 10$ is established between the projection width Lg of the internal-diameter side projection 24/the external-diameter side projection 26 and the chord length Ls of the vane body 21, the hydraulic power loss can be sufficiently depressed. Thus, an efficient reduction effect of water hydraulic loss due to the reduction of water leakage amount can be obtained. The larger the projection width Lg is, the higher the seal effect is, but a friction loss increases. Thus, when the projection width Lg is excessively large, the loss reduction effect provided by the seal effect is considered to be impaired. Thus, $Lg/Ls \times 100 \leq 10$ is determined as a preferred value.

(Second Embodiment)

Figure 7:
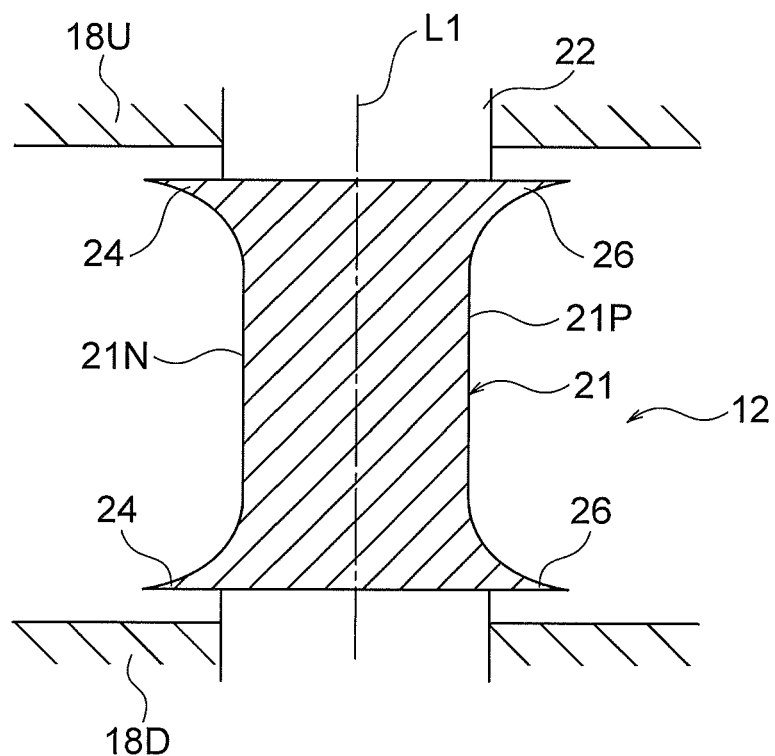
FIG. 7 is a sectional view showing the guide vane and upper and lower covers according to a second embodiment, along an axial direction of the guide vane rotation shaft.

Next, a second embodiment is described. FIG. 7 is a sectional view showing the guide vane and the upper and lower covers according to a second embodiment, along the axial direction of the guide vane rotation shaft. The same constituent element in this embodiment as that of the first embodiment is shown by the same reference symbol, and description thereof is omitted.

This embodiment differs from the first embodiment in shapes of the internal-diameter side projection 24 and the external-diameter side projection 26 of the guide vane 12. Namely, in this embodiment, as shown in FIG. 7, an inner face of each internal-diameter side projection 24, which faces inside (central side) in the axial direction of the guide vane rotation shaft 22, is formed such that it extends from a root side thereof to come close to an outer face toward a distal end on its projection side. Thus, a thickness of each internal-diameter side projection 24 gradually reduces from the root toward the distal end. The external-diameter side projection 26 has the same shape as that of the internal-diameter side projection 24.

According also to the embodiment, an amount of water leaking from one blade face of the guide vane 12 to the other blade face thereof can be effectively decreased, whereby a hydraulic power loss can be effectively decreased. Moreover, resistance from the internal-diameter side projection 24 and the external-diameter side projection 26 against the main flow flowing along the blade faces 21P and 21N of the guide vane 12 can be depressed. Thus, the reduction effect of hydraulic power loss can be improved.

(Third Embodiment)

Figure 8:
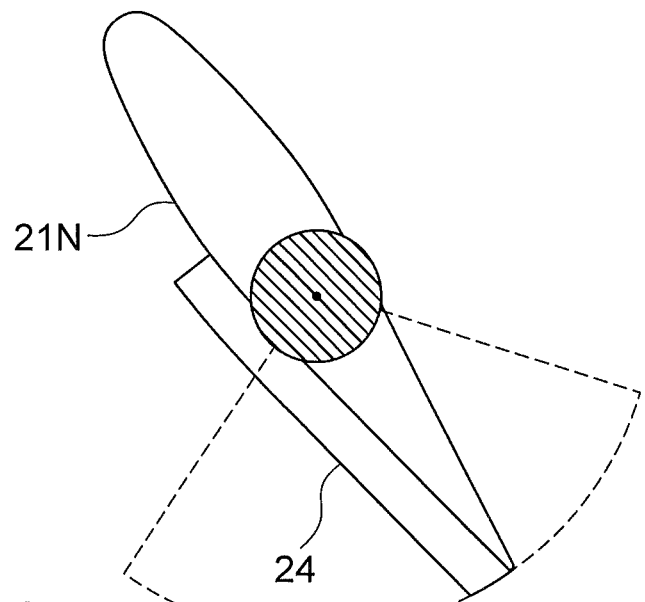
FIG. 8 is a view showing the guide vane of the Francis-type pump turbine according to a third embodiment, seen from one side in an axial direction of the guide vane rotation shaft.

Next, a third embodiment is described. FIG. 8 is a sectional view showing the guide vane of the Francis-type pump turbine according to a third embodiment, seen from one side in the axial direction of the guide vane rotation shaft. The same constituent element in this embodiment as that of the above respective embodiments is shown by the same reference symbol, and description thereof is omitted.

This embodiment differs from the first embodiment in that the guide vane 12 is not equipped with the external-diameter side projection 26. Namely, in this embodiment, as shown in FIG. 8, the internal-diameter side projection 24 is provided only on the internal-diameter side blade face 21N of the guide vane 12.

According also to the embodiment, an amount of water leaking from one blade face of the guide vane 12 to the other blade face thereof can be effectively decreased, whereby a hydraulic power loss can be effectively decreased. In particular, in this embodiment, in a case where it is difficult to provide both the internal-diameter side projection 24 and the external-diameter side projection 26, because of limitation in manufacture and/or limitation in structure, the reduction effect of hydraulic power loss can be efficiently obtained. In addition, the manufacture is facilitated and the material can be reduced, whereby the reduction effect of hydraulic power loss can be obtained while the manufacturing cost is depressed.

In this embodiment, only the internal-diameter side blade face 21N of the guide vane 12 is equipped with the internal-diameter side projection 24. However, only the external-diameter side blade face 21P of the guide vane 12 may be quipped with the external-diameter side projection 26.

(Fourth Embodiment)

Figure 9:
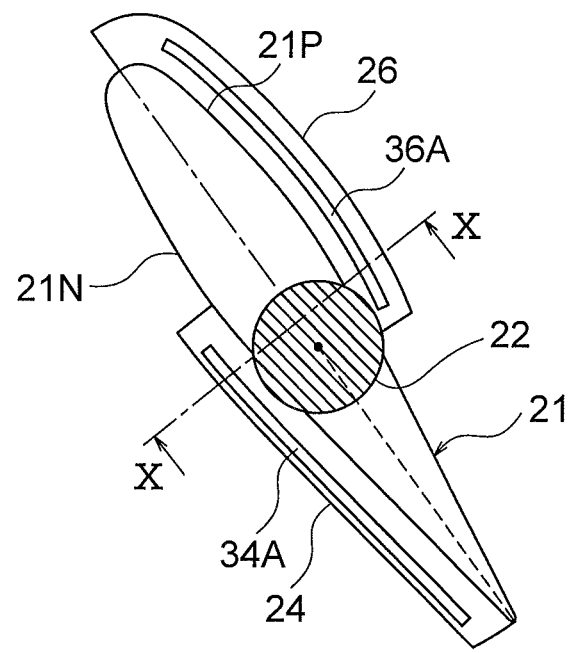
FIG. 9 is a view showing the guide vane of the Francis-type pump turbine according to a fourth embodiment, seen from one side in an axial direction of the guide vane rotation shaft.
Figure 10:
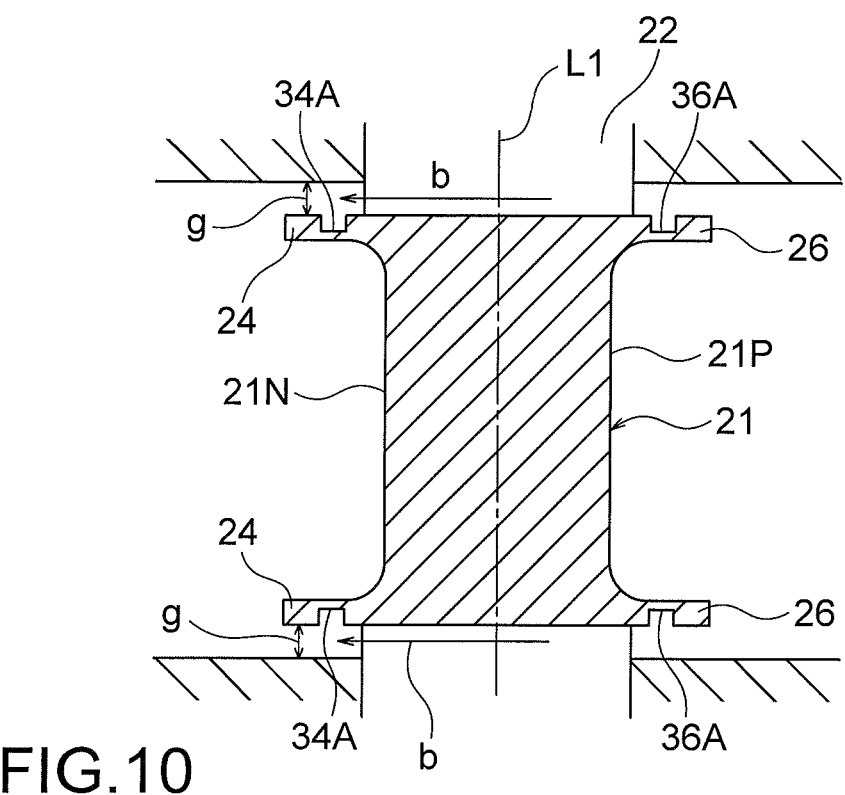
FIG. 10 is a sectional view taken along the X-X line of FIG. 9.

Next, a fourth embodiment is described. FIG. 9 is a sectional view showing the guide vane of the Francis-type pump turbine according to a fourth embodiment, seen from one side in the axial direction of the guide vane rotation shaft. FIG. 10 is a sectional view taken along the X-X line of FIG. 9. The same constituent element in this embodiment as that of the above respective embodiments is shown by the same reference symbol, and description thereof is omitted.

This embodiment differs from the first embodiment in shapes of the internal-diameter side projection 24 and the external-diameter side projection 26. Namely, in this embodiment, as shown in FIGS. 9 and 10, a groove 34A extending along the vane body 21 is formed in an outer face of the internal-diameter projection 24, which faces outside in the axial direction of the guide vane rotation shaft 22. In addition, a grove 36A extending along the vane body 21 is formed in an outer face of the external-diameter projection 26, which faces outside in the axial direction of the guide vane rotation shaft 22.

In this embodiment, the groove 34A is formed in each of the upper and lower internal-diameter side projections 24, and the groove 36A is formed in each of the upper and lower external-diameter side projections 26. As shown in FIG. 9, the groove 34A provided in the internal-diameter side projection 24 extends along the internal-diameter side blade face 21N of the vane body 21, and the groove 36A provided in the external-diameter side projection 26 extends along the external-diameter side blade face 21P of the vane body 21. In the illustrated example, the cross-sectional shape of the groove 34A, 36A is rectangular, but may be arcuate or triangular.

According also to the embodiment, an amount of water leaking from one blade face of the guide vane 12 to the other blade face thereof can be effectively decreased, whereby a hydraulic power loss can be effectively decreased. In particular, in this embodiment, owing to the grooves 34A and 36A, areas of the internal-diameter side projection 24 and the external-diameter side projection 26 to be in contact with the gap flow (b) which will pass through the gap (g) increases, and a channel area of the gap (g) locally enlarges. Thus, a pressure inside the grooves 34A and 36A locally varies, whereby a flow velocity of the gap flow (b) can be significantly lowered. Thus, the reduction effect of hydraulic power loss can be improved. In addition, since the grooves 34A and 36A extend along the vane body 21, the flow velocity of the gap flow (b) can be lowered over a wide range by such a simple shape. Thus, the reduction effect of hydraulic power loss can be efficiently improved.

(Fifth Embodiment)

Figure 11:
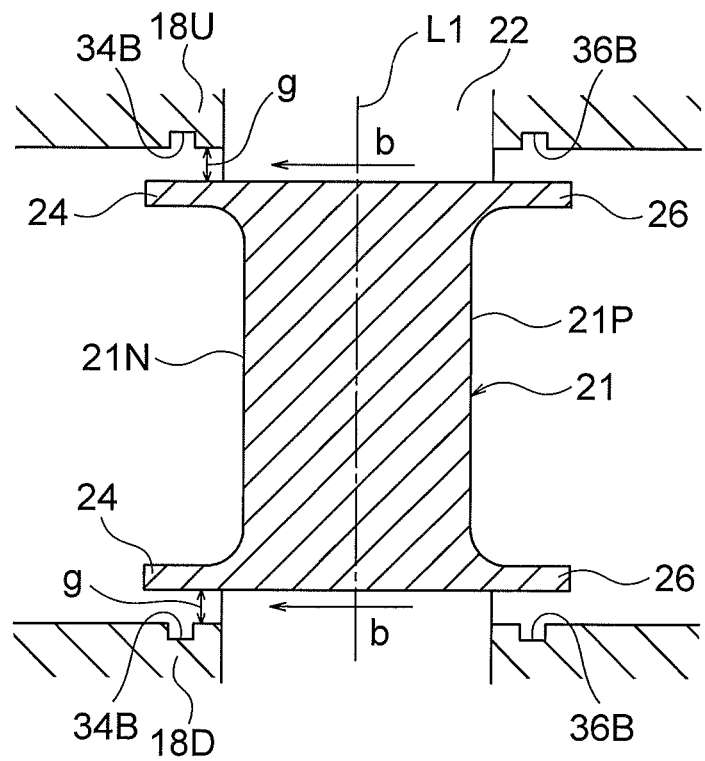
FIG. 11 is a sectional view showing the guide vane and the upper and lower covers of the Francis-type pump turbine according to a fifth embodiment, along the axial direction of the guide vane rotation shaft.
Figure 12:
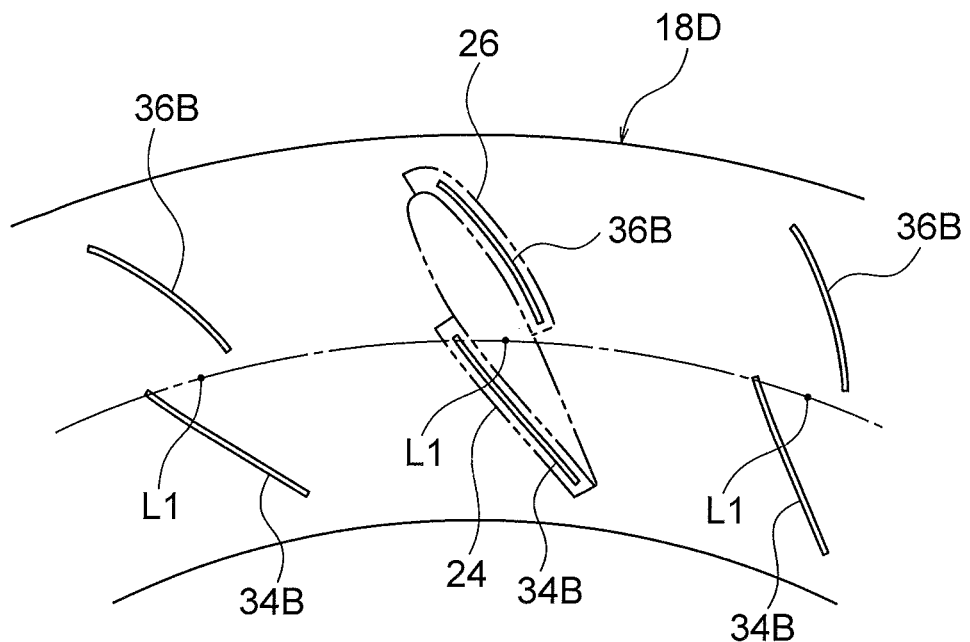
FIG. 12 is a view for explaining a positional relationship between the guide vane and grooves formed in the upper and lower covers shown in FIG. 11.

Next, a fifth embodiment is described. FIG. 11 is a sectional view showing the guide vane and the upper and lower covers of the Francis-type pump turbine according to a fifth embodiment, along the axial direction of the guide vane rotation shaft. FIG. 12 is a view for explaining a positional relationship between the guide vane and grooves formed in the upper and lower covers shown in FIG. 11. The same constituent element in this embodiment as that of the above respective embodiments is shown by the same reference symbol, and description thereof is omitted.

This embodiment differs from the first embodiment in shapes of the upper cover 18U and the lower cover 18D.

Namely, in this embodiment, as shown in FIGS. 11 and 12, grooves 34B and 36B are formed in portions of wall surfaces of the upper cover 18U and the lower cover 18D, located on the sides of the projections 24 and 26, the portions facing the projections 24 and 26. The grooves 34B and 36B extend along a direction of water flowing from the casing 10 to the guide vane 12, in particular, along a direction of water of the main flow, during the turbine operation. The main flow water direction means a direction of water flowing along the blade faces of the guide vane 12.

To be specific, the grooves 34B are formed respectively in the portion of the upper cover 18U, which is opposed to the upper internal-diameter side projection 24, and in the portion of the lower cover 18D, which is opposed to the lower internal-diameter side projection 24. In addition, the grooves 36B are formed respectively in the portion of the upper cover 18U, which is opposed to the upper external-diameter side projection 26, and in the portion of the lower cover 18D, which is opposed to the lower external-diameter side projection 26.

FIG. 12 is a view of the lower cover 18D seen from above. In FIG. 12, a condition in which the guide vane 12 is located on a position corresponding to a design point is shown by the two-dot chain lines. More specifically, the grooves 34B and 36B in this embodiment are formed such that, when the guide vane 12 is located on the position corresponding to the design point, the grooves 34B and 36B extend along the vane body 21 of the guide vane 12, seen in the axial direction of the guide vane rotation shaft 22. Although FIG. 12 shows the lower grooves 34B and 36B, the same relationship holds true between the upper groove 34B, 36B and the upper projection 24, 26. The design point means an operation condition for obtaining optimum efficiency, which is specifically determined for the turbine 1. The operation condition includes a head, a flow rate, a position (angle) of the guide vane 12, and so on.

According also to the embodiment, an amount of water leaking from one blade face of the guide vane 12 to the other blade face thereof can be effectively decreased, whereby a hydraulic power loss can be effectively decreased. In particular, in this embodiment, owing to the grooves 34B and 36B, areas of the internal-diameter side projection 24 and the external-diameter side projection 26 to be in contact with the gap flow (b) which will pass through the gap (g) increases, and a channel area of the gap (g) locally enlarges. Thus, a pressure inside the grooves 34B and 36B locally varies, whereby a flow velocity of the gap flow (b) can be significantly lowered. Thus, the reduction effect of hydraulic power loss can be improved.

In the fourth embodiment, the groove 34A is formed in the projection 24, and the groove 36A is formed in the projection 26. On the other hand, in the fifth embodiment, the grooves 34B and 36B are formed in the upper cover 18U, and the grooves 34B and 36B are formed in the lower cover 18D. However, for example, grooves may be formed both in the projections and the covers opposed to the projections.

(Sixth Embodiment)

Figure 13:
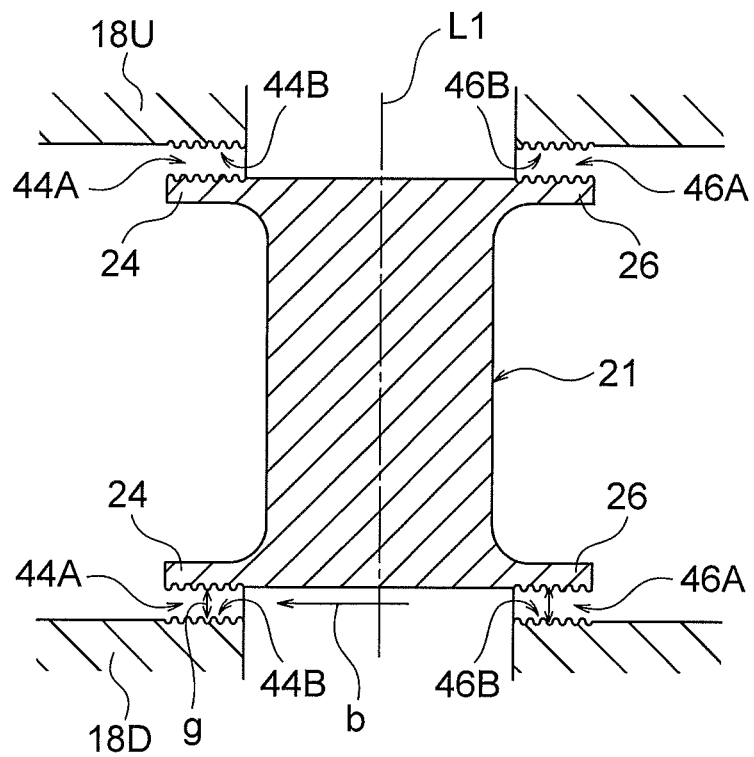
FIG. 13 is a sectional view showing the guide vane and the upper and lower covers of the Francis-type pump turbine according to a sixth embodiment, along the axial direction of the guide vane rotation shaft.

Next, a sixth embodiment is described. FIG. 13 is a sectional view showing the guide vane and the upper and lower covers of the Francis-type pump turbine according to a sixth embodiment, along the axial direction of the guide vane rotation shaft. The same constituent element in this embodiment as that of the above respective embodiments is shown by the same reference symbol, and description thereof is omitted.

This embodiment differs from the first embodiment in shapes of the guide vane 12, the upper cover 18U and the lower cover 18D. Namely, in this embodiment, as shown in FIG. 13, an irregular shape 44A is formed in an outer face of the internal-diameter projection 24, which faces outside in the axial direction of the guide vane rotation shaft 22, and an irregular shape 46A is formed in an outer face of the external-diameter projection 26, which faces outside in the axial direction of the guide vane rotation shaft 22. In this embodiment, the irregular shape 44A is formed in each of the upper and lower internal-diameter side projections 24, and the irregular shape 46A is formed in each of the upper and lower external-diameter side projections 26.

In this embodiment, irregular shapes 44B are formed respectively in a portion of the upper cover 18U, which is opposed to the upper internal-diameter side projection 24, and in a portion of the lower cover 18D, which is opposed to the lower internal-diameter side projection 24. In addition, irregular shapes 46B are formed respectively in a portion of the upper cover 18U, which is opposed to the upper external-diameter side projection 26, and in a portion of the lower cover 18D, which is opposed to the lower external-diameter side projection 26.

The irregular shapes 44A, 44B, 46A and 46B are formed by concavities and convexities. The irregular shapes 44A, 44B, 46A and 46B may be directly formed on surfaces of the projections or the covers by sand blasting, or may be formed by coating the surfaces with a layer having concavities and convexities. A surface roughness of the irregular shapes 44A, 44B, 46A and 46B, which is specified in compliance with JIS B 0601:2001, is preferably greater than 12.5.

According also to the embodiment, an amount of water leaking from one blade face of the guide vane 12 to the other blade face thereof can be effectively decreased, whereby a hydraulic power loss can be effectively decreased. In particular, in this embodiment, owing to the irregular shapes 44A, 44B, 46A and 46B, areas of the internal-diameter side projection 24 and the external-diameter side projection 26 to be in contact with the gap flow (b) which will pass through the gap (g) increases, and a channel area of the gap (g) locally enlarges and reduces. Thus, a flow velocity of the gap flow (b) can be significantly lowered. As a result, the reduction effect of hydraulic power loss can be improved.

In the sixth embodiment, the irregular shapes 44A and 46A are formed on the projections 24 and 26, and the irregular shapes 44B and 46B are formed on the upper cover 18U and the lower cover 18D. However, for example, the irregular shapes may be formed on the projections or the covers facing the projections.

(Seventh Embodiment)

Figure 14:
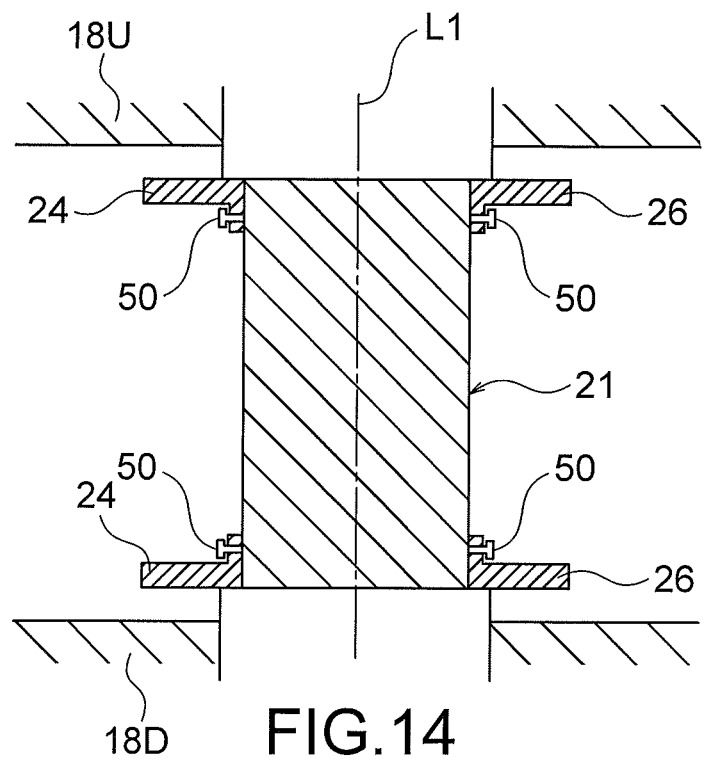
FIG. 14 is a sectional view showing the guide vane and the upper and lower covers of the Francis-type pump turbine according to a seventh embodiment, along the axial direction of the guide vane rotation shaft.

Next, a seventh embodiment is described. FIG. 14 is a sectional view showing the guide vane and the upper and lower covers of the Francis-type pump turbine according to a seventh embodiment, along the axial direction of the guide vane rotation shaft. The same constituent element in this embodiment as that of the above respective embodiments is shown by the same reference symbol, and description thereof is omitted.

This embodiment differs from the first embodiment in a shape of the guide vane 12. Namely, in this embodiment, as shown in FIG. 14, the internal-diameter side projection 24 and the external-diameter side projection 26 are detachably attached to the vane body 21 by means of fastening members 50 such as screws or bolts.

According also to the embodiment, an amount of water leaking from one blade face of the guide vane 12 to the other blade face thereof can be effectively decreased, whereby a hydraulic power loss can be effectively decreased. In particular, in this embodiment, the internal-diameter side projection 24 and the external-diameter projection 26 can be manufactured separately from the vane body 21, their manufacture can be facilitated. In addition, when the internal-diameter side projection 24 and the external-diameter projection 26 are broken or damaged, they can be easily replaced, thereby improve convenience in use. In addition, the vane body 21 can be manufactured out of a material different from that of the internal-diameter side projection 24 and the external-diameter projection 26.

While certain embodiments have been described, these embodiments have been presented by way of example only, and are not intended to limit the scope of the inventions. Indeed, the novel embodiments described herein may be embodied in a variety of other forms; further more, various omissions, substitutions and changes in the form of the embodiments described herein may be made without departing from the sprit of the inventions. The accompanying claims and their equivalents are intended to cover such forms or modifications as would fall within the scope and sprit of the inventions.

For example, in the above respective embodiments, the internal-diameter side projection 24 is provided on both the upper area and the lower area of the internal-diameter blade face 21N in the axial direction of the guide vane rotation shaft 22. However, the internal-diameter side projection 24 may be provided only on one of the upper area and the lower area of the internal-diameter blade face 21N. Similarly, the external-diameter side projection 26 may be provided only on one of the upper area and the lower area of the external-diameter side blade face 21P.

In addition, in the above respective embodiments, the rotation axis C1 of the runner 14 of the turbine 1 extends in the up and down direction. However, the turbine 1 may be of a type in which the rotation axis C1 of the runner 14 extends laterally.

What is claimed is:

1. A guide vane of a hydraulic machine, comprising a vane body and a guide vane rotation shaft connected to the vane body, the guide vane rotation shaft being configured to rotate the entire vane body by a rotation of the guide vane rotation shaft,
    the guide vane being located radially outside a runner of the hydraulic machine to be rotatable about the guide vane rotation shaft, with the guide vane rotation shaft being in parallel to a rotation axis of the runner, wherein:
    the vane body includes a leading edge, a trailing edge which is located closer to the runner than the leading edge when located radially outside the runner, an internal-diameter side blade face being disposed on a first side of the runner, and an external-diameter side blade face being disposed on a second side opposed to the first side of the runner;
    an inner-side projection extending in a direction from the trailing edge toward the leading edge is provided on the internal-diameter side blade face of the vane body;
    an outer-side projection extending in a direction from the leading edge toward the trailing edge is further provided on the external-diameter side blade face of the vane body;
    the inner-side projection extending in the direction from the trailing edge toward the leading edge and the outer-side projection extending in the direction from the leading edge toward the trailing edge are provided in at least any one of an upper side area of the guide vane and a lower side area of the guide vane in an axial direction of the guide vane rotation shaft;
    the inner-side projection in the direction from the trailing edge toward the leading edge has a first projection rear end of an arcuate shape, wherein the first projection rear end is formed to extend along a rotation trajectory which is drawn by the trailing edge when the vane body is rotated about the guide vane rotation shaft;
    the outer-side projection extending in the direction from the leading edge toward the trailing edge has a projection front end, wherein the projection front end is formed to extend along an extension of camber line of the vane body;
    when the guide vane is in a full closed condition, the external-diameter side blade face of the guide vane and an adjacent internal-diameter side blade face of a first adjacent guide vane are in contact with each other, and the internal-diameter side blade face of the guide vane and an adjacent external-diameter side blade face of a second adjacent guide vane are in contact with each other; and
    the inner-side projection and the outer-side projection are disposed in positions at which the inner-side projection does not interfere with an adjacent outer-side projection of the second adjacent guide vane, and the outer-side projection does not interfere with an adjacent inner-side projection of the first adjacent guide vane when the guide vane is moved from a full open condition to the full closed condition.

2. The guide vane of a hydraulic machine according to claim 1, wherein a relationship between a chord length of the vane body and a projection width of at least one of the inner-side projection and the outer-side projection is represented by:

$$2 \leq (Lg/Ls) \times 100 \leq 10,$$

wherein Ls is the chord length of the vane body and Lg is the projection width.

3. The guide vane of a hydraulic machine according to claim 1, wherein an outer face of at least one of the inner-side projection and the outer-side projection, which faces outside in the axial direction of the guide vane rotation shaft, is coplanarly continuous with an end face of the vane body on which the at least one of the inner-side projection and the outer-side projection is provided.

4. A hydraulic machine comprising:
    a runner configured to rotate about a rotation axis; and
    the guide vane according to claim 1, wherein the guide vane is located radially outside the runner.

5. A guide vane of a hydraulic machine, comprising a vane body and a guide vane rotation shaft connected to the vane body, the guide vane rotation shaft being configured to rotate the entire vane body by a rotation of the guide vane rotation shaft,
    the guide vane being located radially outside a runner of the hydraulic machine to be rotatable about the guide vane rotation shaft, with the guide vane rotation shaft being in parallel to a rotation axis of the runner, wherein:
    the vane body includes a leading edge, a trailing edge which is located closer to the runner than the leading edge when located radially outside the runner, an internal-diameter side blade face being disposed on a first side of the runner, and an external-diameter side blade face being disposed on a second side opposed to the first side of the runner;
    an inner-side projection extending in a direction from the trailing edge toward the leading edge is provided on the internal-diameter side blade face of the vane body;
    an outer-side projection extending in a direction from the leading edge toward the trailing edge is further provided on the external-diameter side blade face of the vane body;
    the inner-side projection extending in the direction from the trailing edge toward the leading edge and the outer-side projection extending in the direction from the leading edge toward the trailing edge are provided in at least any one of an upper side area of the guide vane and a lower side area of the guide vane in an axial direction of the guide vane rotation shaft;
    the inner-side projection in the direction from the trailing edge toward the leading edge has a first projection rear end of an arcuate shape, wherein the first projection rear end is formed to extend along a rotation trajectory which is drawn by the trailing edge when the vane body is rotated about the guide vane rotation shaft; and
    the outer-side projection extending in the direction from the leading edge toward the trailing edge has a projection front end, wherein the projection front end is formed to extend along an extension of camber line of the vane body.

* * * * *